US012614484B1

(12) United States Patent
Humphrey et al.

(10) Patent No.: US 12,614,484 B1
(45) Date of Patent: Apr. 28, 2026

(54) REAL-TIME UPDATEABLE AUDIO RESONANCE SPECULAR HOLOGRAPHIC DISPLAY

(71) Applicant: Lenovo Global Technology (United States) Inc., Morrisville, NC (US)

(72) Inventors: Grason Humphrey, Morrisville, NC (US); Eric Li, Morrisville, NC (US); Michael DeCesaris, Morrisville, NC (US); Milton Cobo, Morrisville, NC (US)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 0 days.

(21) Appl. No.: 19/069,554

(22) Filed: Mar. 4, 2025

(51) Int. Cl.
| | |
|---|---|
| *G09G 3/00* | (2006.01) |
| *G06F 3/01* | (2006.01) |
| *H04R 1/02* | (2006.01) |
| *H04R 1/40* | (2006.01) |
| *H04R 3/12* | (2006.01) |

(52) U.S. Cl.
CPC ............. *G09G 3/003* (2013.01); *G06F 3/012* (2013.01); *H04R 1/028* (2013.01); *H04R 1/403* (2013.01); *H04R 3/12* (2013.01); *G09G 2340/0492* (2013.01); *G09G 2354/00* (2013.01); *H04R 2201/401* (2013.01); *H04R 2499/15* (2013.01)

(58) Field of Classification Search
CPC ................... G06F 3/012; G09G 3/003; G09G 2340/0492; G09G 2354/00; H04R 1/028; H04R 1/403; H04R 3/12; H04R 2201/401; H04R 2499/15
See application file for complete search history.

(56) References Cited

U.S. PATENT DOCUMENTS

| | | | | |
|---|---|---|---|---|
| 8,203,537 B2 * | 6/2012 | Tanabe | ................ | G06F 3/04886 |
| | | | | 345/173 |
| 9,007,444 B2 | 4/2015 | Panas et al. | | |
| 9,298,261 B2 * | 3/2016 | Parthasarathy | ..... | G06F 3/04886 |
| 9,335,848 B2 * | 5/2016 | Ragan, Jr. | ............. | G06F 1/1601 |
| 10,083,633 B2 * | 9/2018 | Bostick | .................... | G09B 5/02 |
| 2009/0002328 A1 * | 1/2009 | Ullrich | ................. | G09B 21/004 |
| | | | | 345/173 |
| 2017/0004819 A1 * | 1/2017 | Ochiai | ................... | G10K 15/02 |
| 2017/0372683 A1 * | 12/2017 | Du | ........................... | G09G 5/10 |

(Continued)

OTHER PUBLICATIONS

Brand, Matthew, "Specular holography", Nov. 30, 2010.

(Continued)

*Primary Examiner* — Ryan A Lubit
(74) *Attorney, Agent, or Firm* — John M. Rogitz; John L. Rogitz

(57) ABSTRACT

In one aspect, a device includes a processor system and storage accessible to the processor system. The storage includes instructions executable by the processor system to dynamically actuate one or more speaker drivers in a specular holographic display to render holographic three dimensional (3D) images via audio resonance. The display may therefore be controlled in real time using acoustic waves to adjust the appearance of an object represented by the 3D images. In some particular instances, the appearance of the object may be adjusted based on user interaction with the object, such as the user trying to look around the object or the user providing a command to rotate the object.

20 Claims, 5 Drawing Sheets

(56) References Cited

U.S. PATENT DOCUMENTS

| | | | | |
|---|---|---|---|---|
| 2018/0343519 | A1* | 11/2018 | Rakshit | H04R 1/403 |
| 2019/0033576 | A1* | 1/2019 | Oster | H10N 30/04 |
| 2022/0312109 | A1* | 9/2022 | Misawa | H04R 17/00 |
| 2023/0283961 | A1* | 9/2023 | Lee | G06F 1/1694 |
| | | | | 381/190 |

OTHER PUBLICATIONS

Brand, Matthew, "Specular Holography", retrieved from https://zintaglio.com/nature.html, 2008-2010.

Chen et al., "Investigation of Autostereoscopic Displays Based on Various Display Technologies", Jan. 27, 2022, nanomaterials, MDPI.

Forrister, Thomas, "How Do Chladni Plates Make It Possible to Visualize Sound?", Comsol Blog, Aug. 17, 2018.

Li Z, Yang Y, Lu Q, Wei X, Hou C, Quan Y, Lu X, Bao W, Yang Y, Fei C. Dynamic Acoustic Holography: One-Shot High-Precision and High-Information Methodology. Micromachines. 2024; 15(11):1316. https://doi.org/10.3390/mi15111316.

Mould, Steve, "Handmade holograms are really weird", YouTube, 2023, retrieved from https://www.youtube.com/watch?v=sv-38lwV6vc.

Seung-Yeon Jang et al. ,Dynamically reconfigurable shape-morphing and tactile display via hydraulically coupled mergeable and splittable PVC gel actuator. Sci. Adv. 10,(2024). DOI:10.1126/sciadv.adq2024.

Van De Loo et al., "Autostereoscopy Putting Things in Perspective", Final Thesis Project, Nov. 28, 2014.

Wetzstein et al., "Compressive Light Field Displays", MIT Media Lab, date unknown.

Yoon, H., Oh, SG., Kang, D. et al. "Arrays of Lucius microprisms for directional allocation of light and autostereoscopic three-dimensional displays", Nat Commun 2, 455 (2011). https://doi.org/10.1038/ncomms1456.

\* cited by examiner

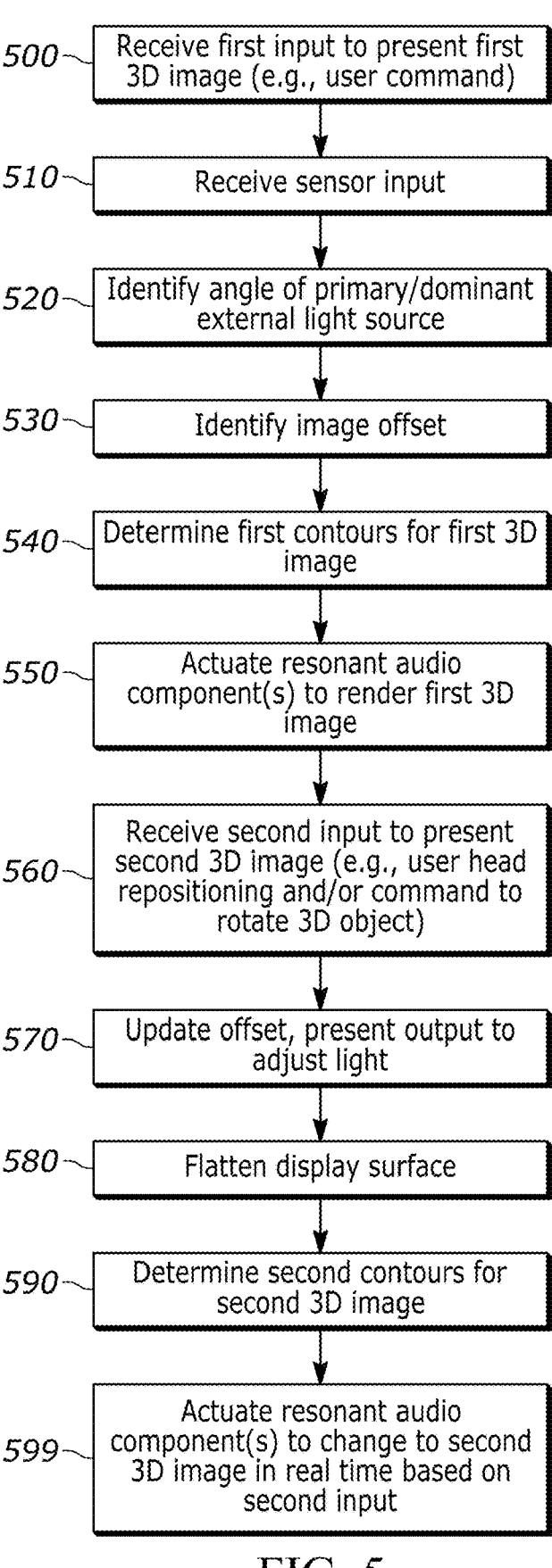

500 — Receive first input to present first 3D image (e.g., user command)

510 — Receive sensor input

520 — Identify angle of primary/dominant external light source

530 — Identify image offset

540 — Determine first contours for first 3D image

550 — Actuate resonant audio component(s) to render first 3D image

560 — Receive second input to present second 3D image (e.g., user head repositioning and/or command to rotate 3D object)

570 — Update offset, present output to adjust light

580 — Flatten display surface

590 — Determine second contours for second 3D image

599 — Actuate resonant audio component(s) to change to second 3D image in real time based on second input

FIG. 5

REAL-TIME UPDATEABLE AUDIO RESONANCE SPECULAR HOLOGRAPHIC DISPLAY

FIELD

The disclosure below relates to technically inventive, non-routine solutions that are necessarily rooted in computer technology and that produce concrete technical improvements. In particular, the disclosure below relates to real-time updateable audio resonance specular holographic displays.

BACKGROUND

Stereoscopic displays can present interactable three-dimensional (3D) images to a viewer. But as recognized herein, these displays often leave something to be desired in terms of realistic appearance of the 3D images. There are currently no adequate solutions to the foregoing computer-related, technological problem.

SUMMARY

Accordingly, in one aspect a device includes a processor system and storage accessible to the processor system. The storage includes instructions executable by the processor system to actuate one or more first speaker drivers in a specular holographic display to render a first three dimensional (3D) image on the specular holographic display. The instructions are also executable to receive a command to present, on the specular holographic display, a second 3D image different from the first 3D image. The instructions are further executable to, responsive to the command, actuate one or more second speaker drivers in the specular holographic display to render the second 3D image on the specular holographic display.

In some examples, the one or more second speaker drivers may be different from the one or more first speaker drivers.

Additionally, in some example embodiments the one or more first speaker drivers and the one or more second speaker drivers may be actuated to establish one or more contours in a substance in a display surface of the specular holographic display. The substance may be established by a liquid and/or a solid, such as an oil or powder, and may be reflective. However, the substance may be established by a gas as well.

Also in some example embodiments, the one or more first speaker drivers and the one or more second speaker drivers may be arranged in a grid array within the specular holographic display. If desired, the instructions may even be executable to selectively actuate the one or more first speaker drivers in the grid array to direct a substance within the specular holographic display to desired locations on a display surface of the specular holographic display to render the first 3D image. Here the instructions may also be executable to selectively actuate the one or more second speaker drivers in the grid array to direct the substance to desired locations on the display surface to render the second 3D image as well.

Additionally, note that in some non-limiting implementations, the command may be a command to rotate an object represented by the first 3D image, and the second 3D image may be a rotated version of the first 3D image. Additionally or alternatively, the command may be generated based on detecting head movement of a viewer.

What's more, in some non-limiting instances the device may include the specular holographic display itself.

In another aspect, a method includes actuating one or more first speaker drivers in a display to establish first contours on the display to render a first three dimensional (3D) image. The method also includes identifying a trigger to present, on the display, a second 3D image different from the first 3D image. The method further includes, responsive to identifying the trigger, actuating one or more second speaker drivers in the display to establish second contours on the display to render the second 3D image.

In some non-limiting implementations, the display may be a specular holographic display.

Also in some non-limiting implementations, the one or more first speaker drivers may include plural first speaker drivers, and the one or more second speaker drivers may include plural second speaker drivers. Here the method may include individually actuating each of the plural first speaker drivers to arrange at least some of a substance in the display to establish the first contours, and individually actuating each of the plural second speaker drivers to arrange at least some of the substance to establish the second contours.

Still further, in some cases the one or more first speaker drivers and the one or more second speaker drivers may be arranged in a speaker array within the display.

In still another aspect, a device includes at least one computer readable storage medium (CRSM) that is not a transitory signal. The at least one CRSM includes instructions executable by a processor system to use acoustic waves to render, on a specular holographic display, a three dimensional (3D) image.

In some example embodiments, the instructions may be executable to use resonant acoustic waves to render, on the specular holographic display, the 3D image.

Also in some example embodiments, the instructions may be executable to control one or more speaker drivers in a speaker array to produce the acoustic waves. In one particular implementation, the speaker array may include plural speaker drivers arranged in M-by-N grid format.

Additionally, if desired the device may include the processor system itself.

BRIEF DESCRIPTION OF THE DRAWINGS

The details of present principles, both as to their structure and operation, can best be understood in reference to the accompanying drawings, in which like reference numerals refer to like parts, and in which:

FIG. 5 illustrates example logic in flow chart format that may be executed by a specular holographic display and/or connected device consistent with present principles.

DETAILED DESCRIPTION

Figure 1:
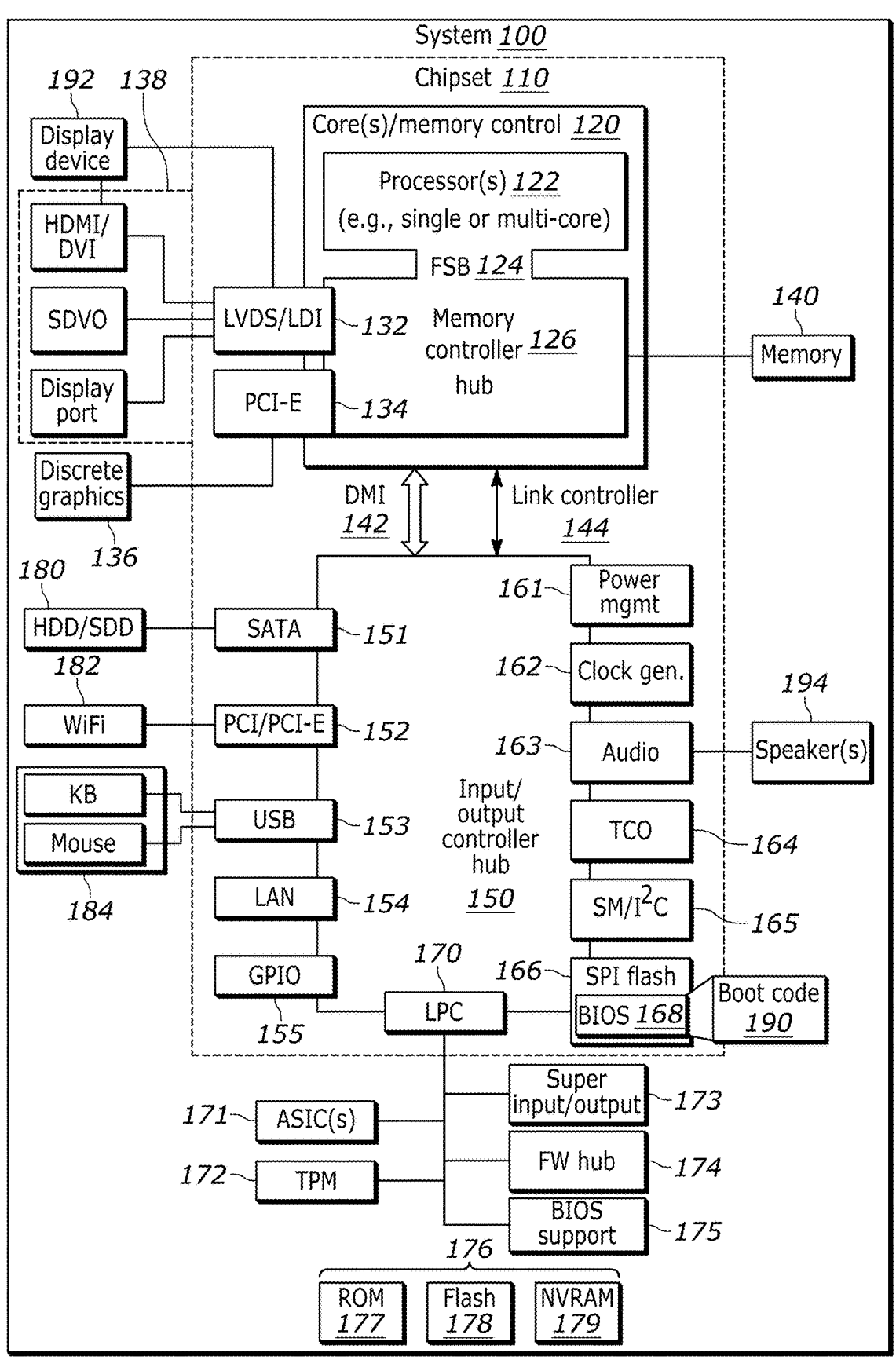
FIG. 1 is a block diagram of an example system consistent with present principles.

Among other things, the detailed description below describes real-time, updateable, audio resonance-based specular holographic displays that may be used to present true 3D images. This allows for occlusion and "looking around" the 3D image in real life. The displays disclosed herein may therefore be configured via various audio resonance means (e.g., speaker configurations) to present autostereoscopic holographic images that are updateable in real-time, permitting the viewer to perceive the true, encoded 3D image even when moving his or her head to "look around" the image. This, in turn, avoids a break in the holographic illusion that would otherwise be perceived by the viewer as the viewer moves relative to the display. A relatively large viewing angle may therefore be afforded by present principles for adequate perception of the 3D effect of the image being rendered. Accordingly, by playing different audio out of different speaker drivers as described in greater detail below, the display can control what pattern is produced in a powder or other substance to get the desired 3D effect. In one particular example, the device may use one or more audio geometry algorithms to control the speaker drivers to get that effect.

Thus, an otherwise 2D reflective display surface may exhibit curved ridges to create a perceived 3D image, using the reflective display surface to reflect light to the viewer's eyes in a way that allows perception of a true 3D image. Because the curves reflect light to each of the viewer's eyes at slightly different angles, the viewer perceives the reflected light glints as "virtual points" in 3D, either above or below the actual display surface. The position of each virtual point can be set to any position in 3D space by controlling the radius and center position of the reflective curve. Many curves can therefore be used to create many 3D virtual points, which may all combine to form a desired 3D virtual image to be seen by a human viewer.

With the foregoing in mind, in one particular aspect, innovative autostereoscopic displays may be both holographic and updateable in real-time. This gives the advantages of both displaying a true 3D image with a wide viewing angle (rather than displaying one or more stereoscopic two dimensional (2D) images) and also enabling the ability to change the image being displayed. To implement this, aspects discussed below provide for the changing of the shape of the display itself instead of simply digitally updating one or more 2D image display screens like liquid crystal displays, light emitting diode displays, etc. Doing so allows the specular holographic image to be updated in real-time, dynamically changing the shape of the reflective display surface on the fly for high-fidelity 3D image rendering as discussed further below.

Additionally, for certain resonant audio specular holography embodiments consistent with present principles, they may be used to change the shape of the display in a variety of ways. For example, in one non-limiting embodiment, a real-time specular holographic display system may include a reflective liquid or powder serving as at least part of a flexible and reflective display screen. The system may also include an array of speaker drivers for deforming the display to the desired shape via audio resonance to thus render a desired specular hologram, a computer system to determine what screen deformations are needed in the first place to form the desired specular hologram, and a light source mounted at an angle to the screen to generate specular light glints. However, it is to be further understood that ambient front lighting and/or other front lighting may also be used to help create the 3D appearance for the image.

When the display is to be changed, the flexible display surface can then be smoothed either by electrical or mechanical techniques to reset any remaining deformations, and the process may begin again.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used, as may a Chrome or Android or Windows or macOS or iOS operating system. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor such as a central processing unit (CPU), a graphics processing unit (GPU), a neural processing unit (NPU), a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in the art. Where employed, the software instructions may also be embodied in a non-transitory device that is being vended and/or provided, and that is not a transitory, propagating signal and/or a signal per se. For instance, the non-transitory device may be or include a hard disk drive, solid state drive, or CD ROM. Flash drives may also be used for storing the instructions. Additionally, the software code instructions may also be downloaded over the Internet (e.g., as part of an application ("app") or software file). Accordingly, it is to be understood that although a software application for undertaking present principles may be vended with a device such as the system 100 described below, such an application may also be downloaded from a server to a device over a network such as the Internet. An application can also run on a server and associated presentations may be displayed through a browser (and/or through a dedicated companion app) on a client device in communication with the server.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C#or C++, and can be stored on or transmitted from a computer-readable storage medium such as a hard disk drive (HDD) or solid state drive (SSD), a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "a" or "an" in reference to an entity refers to one or more of that entity. As such, the terms "a" or "an", "one or more", and "at least one" can be used interchangeably herein.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. The term "circuitry" includes all levels of available integration, e.g., from discrete logic circuits to the highest level of circuit integration such as VLSI, and includes programmable logic components programmed to perform the functions of an embodiment as well as processors (e.g., special-purpose processors) programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre®, or notebook computer system, such as ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 includes a processor system 122 (e.g., one or more single core or multi-core processors, etc.) and a memory controller hub 126 that exchange information via a front side bus (FSB) 124. A processor system such as the system 122 may therefore include one or more processors acting independently or in concert with each other to execute an algorithm, whether those processors are in one device or more than one device. Additionally, as described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. For example, the memory controller hub 126 may include a 16-lane (x16) PCI-E port for an external PCI-E-based graphics card (including, e.g., one or more GPUs). An example system may thus include PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speaker drivers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 and/or PCI-E interface 152 provide for reading, writing or reading and writing information on one or more drives 180 such as HDDs, SSDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides related input to the processor system 122, an accelerometer that senses acceleration and/or movement of the system 100 and provides related input to the processor system 122, and/or a magnetometer that senses and/or measures directional movement of the system 100 and provides related input to the processor system 122.

Still further, the system 100 may include an audio receiver/microphone that provides input from the microphone to the processor system 122 based on audio that is detected, such as via a user providing audible input to the microphone. The system 100 may also include a camera that gathers one or more images and provides the images and related input (e.g., metadata like an image timestamp) to the processor system 122. The camera may be a thermal imaging camera, an infrared (IR) camera, a digital camera such as a webcam, a three-dimensional (3D) camera, and/or a camera otherwise integrated into the system 100 and controllable by the processor system 122 to gather still images and/or video.

In addition, the system 100 may include a global positioning system (GPS) transceiver that is configured to communicate with satellites to receive/identify geographic position information and provide the geographic position information to the processor system 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network trained through machine learning may thus include an input layer, an output layer, and multiple hidden layers in between that are configured and weighted to make inferences about an appropriate output.

Figures 2, 3:
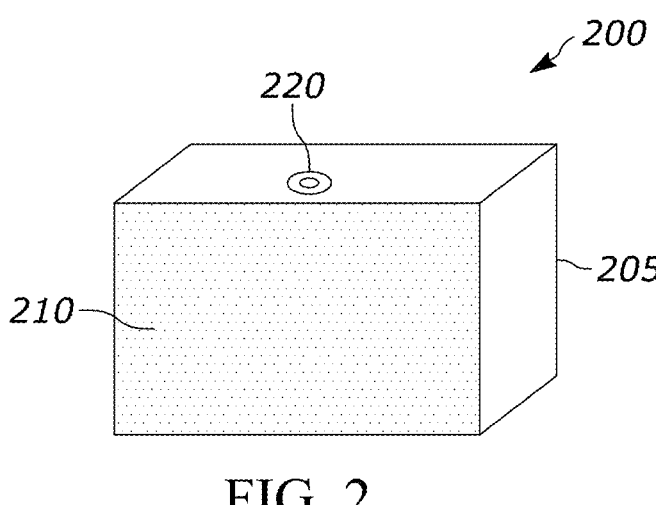
FIG. 2 is a perspective view of an example specular holographic display consistent with present principles.
FIG. 3 is a perspective view showing an example specular holographic display in relation to a light source that emits incident light toward the display consistent with present principles.

Turning to FIG. 2, this figure shows a perspective view of an example specular holographic display 200 consistent with present principles. The display 200 may include a housing 205 that houses some or all of the components of the system 100 described above. In the example shown, the housing 205 may be a rectangular prism or cuboid, though other shapes may also be used for the housing 205. The housing 205 may be made of a polymer, plastic, or other suitable material.

FIG. 2 also shows a flexible first (e.g., front) surface 210 of the display 200, with the shading for the first surface 210 demonstrating that the outer side of the first surface 210 may be made of/covered with a reflective material. As such, the outer side may be made of mylar, aluminum, and/or another suitable reflective material. Also note that in certain non-limiting embodiments, the outer sides of the other housing surfaces may be both rigid and made of/covered with non-reflective material to reduce the chance of 3D image distortions due to reflections of ambient or acute light off those surfaces. Further note that the reflective surface 210 itself (or at least its outer side) may be biased in a planar or convex in shape. The surface 210 may also be generally flat yet may still be dynamically imprintable with ridges as described in greater detail below to allow for the presentation of different 3D holographic images using the reflective outer side of the surface 210.

As also shown in FIG. 2, the display 200 may include a camera 220. The camera 220 may be controlled by a processor system inside the display 200 or a connected device (e.g., a smartphone wirelessly communicating with the display 200). The camera 220 may be used to identify user commands and track user head movements for changing a 3D presentation of the display accordingly.

For example, the user may provide a hand-based gesture command to rotate an object represented by the 3D image(s) being rendered on the display 200, with the display 200 then rotating the object according to the command in response (e.g., by presenting different 3D images showing the object from other angles as rotated versions of the prior 3D image). As another example, the user may physically move his or her head to different positions with respect to the display 200 to inspect the object from different angles, with the display then rotating the object according to the head movement in response to thus show another angle of the 3D object. Other triggers may also be detected using the camera 220 to then alter the appearance of the displayed object in response. Also note here that computer vision and gesture recognition may be used to identify visual commands via the input from the camera 220, with it being further noted that verbal commands as detected via a microphone on the display device 200 may also be used. Keyboard commands, cursor commands, and other types of commands may also be used to trigger a change in 3D images.

Turning to FIG. 3, this figure also shows a perspective view of the display 200. But here, the display 200 is being used to present a holographic 3D "smiley face" 305 via raised ridges in the surface 210.

As also shown in FIG. 3, light from a light source such as a lamp 300 might front-light the surface 210 from a particular angle. With present principles recognizing that the appearance of the holographic image 305 may be adversely affected by light from the acute light source 300 due to the acute light's angle of arrival, the display 200 may use its camera 220 and computer vision to identify the position of the light source 300 with respect to the display 200. Based on the display 200 detecting a suboptimal angle of light from the lamp 300 that causes the virtual points created by the ridges in the reflective surface 210 to be rendered off-center from their intended 3D virtual position according to the user's own viewing angle (also identified using the camera 220 and computer vision/eye tracking), the display may use one of its speaker drivers to present an audible output represented by the speech bubble 310. As shown, the example audible output includes suggestions for optimizing the appearance of the holographic image(s) according to the user's viewing angle, such as "Either turn off the lamp or move the lamp closer to you for optimal viewing."

Figure 4:
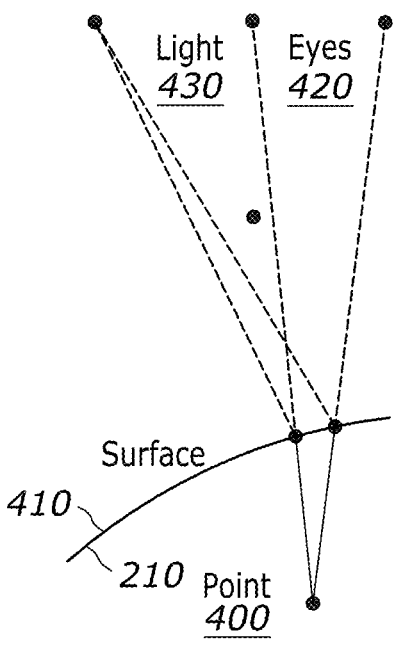
FIG. 4 is a schematic illustrating how a virtual holographic point may be created by a curved ridge in a reflective surface of a specular holographic display consistent with present principles.

Now in reference to FIG. 4, this figure demonstrates how a virtual point 400 may be created by a curved ridge 410 in the reflective surface 210, thus using specular holography to create a perceived 3D image. The display 200 may therefore implement specular holography using curved ridges on an otherwise 2D surface to reflect light to the viewer's eyes 420 according to the user's viewing angle. Because the curves reflect light to each of the viewer's eyes at slightly different angles, the viewer perceives each of the reflected light glints as a "virtual point" 400 in 3D space, either in front of or behind the actual surface 210 itself. The display 200 can therefore set the position of each virtual point 400 to any desired position in 3D space by controlling the radius and center position of the reflective curve being made in the surface 210. The display 200 may use many different curves in the surface 210 to create many 3D virtual points 400, which may all combine to form a desired 3D virtual image to be seen by the viewer.

FIG. 4 also shows that a light source 430 like the lamp 300 might be directing acute light at the ridge 410 from another angle different from the user's viewing angle. The difference in angles between the light source 430 to the display surface 210 and the eyes 420 to the display surface 210 may be identified by the display 200 to then apply an offset for rendering the point 400 to appear at the intended position in 3D space. This may help with high-fidelity 3D holographic image rendering notwithstanding reflected light from the light source 430. This offset will be described in greater detail below.

Referring now to FIG. 5, this figure shows example logic that may be executed by a device such as the display 200 and/or a connected device alone or in any appropriate combination consistent with present principles. The connected device might be a server and/or another client device like a smartphone that communicates with the display 200 over a Wi-Fi or other network. Also note that while the logic of FIG. 5 is shown in flow chart format, other suitable logic may also be used.

The logic may begin at block 500 where the display device may receive first input or identify another trigger to present a first 3D image on its specular holographic display. The first input may be a command received from a user, from another device, etc. The logic may then proceed to block 510 where the device may receive sensor input, such as input from the camera 220 as described above. However, further note that other types of optical sensors may also be used.

From block 510 the logic may then proceed to block 520. Here, the device may use the input from the optical sensor to identify both the angle of arrival of light from an acute light source emitting incident light toward the display, and the viewing angle of a viewer toward the display surface. In one particular example, computer vision may be executed at block 520 to make these identifications, through other image processing techniques may also be used.

The logic of FIG. 5 may then continue to block 530. At this step, the device may identify an image offset to apply to optimize rendering of the virtual points to appear at intended locations in 3D space according to the viewer's own viewing angle notwithstanding reflected light from the acute light source. Various machine learning techniques may be used to identify the offset, as well as one or more rules-based algorithms.

For instance, the offset may be determined as one degree of virtual object rotation (as represented in the 3D image) for every ten to twenty degrees of difference between the user's viewing angle and the acute light source angle as identified at block 520. This technique may help compensate for the slight image shift the user might otherwise perceive while also avoiding overcorrection that could also cause an image shift.

From block 530 the logic may then proceed to block 540. Here, the device may determine one or more first contours for a first 3D image that is to be rendered (according to any offset) via ridges in the display surface of the specular holographic display.

After block 540, the logic of FIG. 5 may proceed to block 550. At block 550 the device may use one or more audio geometry algorithms to control the specular holographic display to render the first 3D image. For example, at block 550 the device may actuate one or more resonant audio components to render the first 3D image. One example of such resonant audio components will be discussed in greater detail below in reference to FIG. 6. From block 550 the logic may then proceed to block 560.

At block 560 the device may receive second input (or identify another trigger) to present a second 3D image on the specular holographic display. The second 3D image may show the same object as the first 3D image but from a different angle, or may show a different object altogether. The object(s) might be an apple, the globe, a car part, a smiley face, etc.

In instances where the second 3D image shows the same object as the first 3D image but from a different viewing angle, the second input may be a user command to rotate the object itself that is being represented by the images. Additionally or alternatively, the second input may be generated based on head movement of the user (e.g., whether intended as a command or not), which in turn may be interpreted by the device as a trigger to rotate the object in the opposite direction as the head movement itself. Thus, note here that the device may access a stored 3D model of the object to use the vertices indicated in the 3D model to identify corresponding 3D points in space that are to be represented via the specular hologram (depending on the particular angle of view of the object that is to be rendered).

Responsive to receipt of the second input, the logic may then proceed to block 570. Here, the device may update the offset being applied based on any change in the user's viewing angle as compared to the incident light angle of arrival. In certain circumstances, at block 570 the device may also present an output to the viewer akin to the example audible output 310 described above (in addition to or in lieu of applying the updated offset), assisting the user in reducing the image shift themselves.

Also responsive to receipt of the second input, at block 580 the device may deactivate the components (e.g., speaker drivers) used to make the ridges for the first 3D image so that resonant acoustic waves are no longer being emitted to render the first 3D image. The device may then flatten/ smooth the display surface to remove any ridges/contours that remain. For example, straps inside the specular holographic display that are connected at each side of the display surface (according to its X-Y plane) may be reeled tight using a motor in the display. This may be done to apply tension to the display surface itself, making it taut and flat to erase the ridges. Then the straps may be released to provide slack for the next 3D image to be rendered on the flexible reflective display surface. Other electrical and mechanical means may also be used to remove the previous ridges and smoothen the display surface.

From block 580 the logic may proceed to block 590. Here, the device may determine one or more second contours for the second 3D image that is to be rendered in the display surface of the specular holographic display (possibly according to the updated offset). The logic may then proceed to block 599 to control the specular holographic display to render the second 3D image according to the user's real-time head movement or according to whatever user command is received.

Thus, at both of steps 550 and 590, the device may use one or more audio geometry algorithms to actuate the one or more resonant audio components inside the specular holographic display's housing to acoustically influence a substance in the display, making ridges in the display surface to render the desired 3D image. A first non-limiting example embodiment of resonant audio components that may be used consistent with present principles will now be described in reference to FIG. 6. Note that the aforementioned substance itself, as employed according to the embodiment of FIG. 6, may be established by a liquid and/or a solid, such as an oil or a powder. The substance may also be reflective in certain examples. In addition, in some examples the substance may include a gas such as air.

Figure 6:
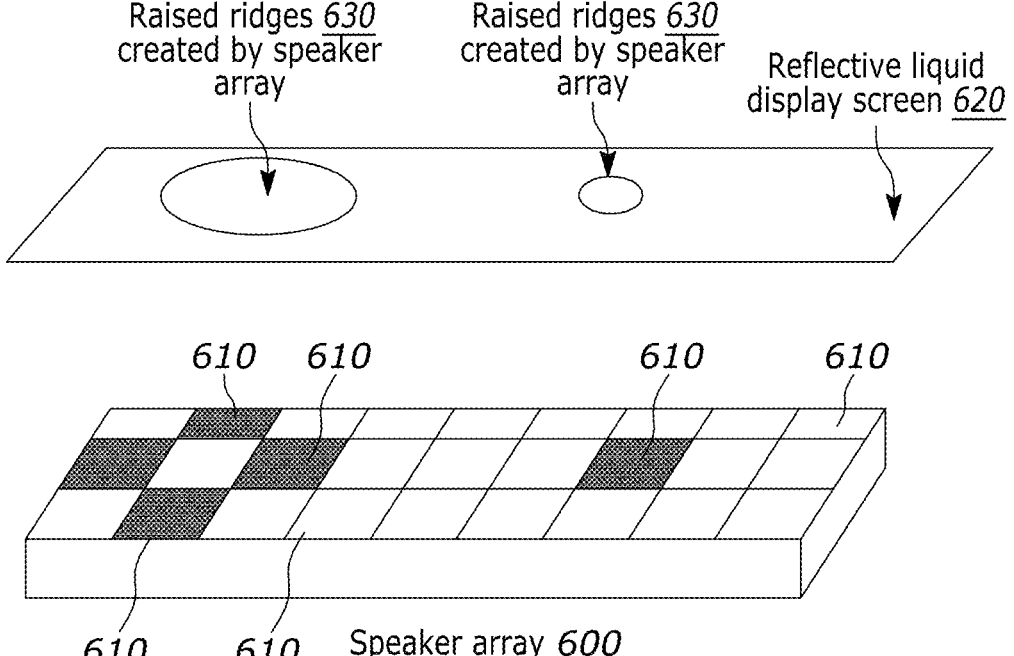
FIG. 6 shows an exploded side view of one example embodiment consistent with present principles, with this embodiment including plural individually-actuatable speaker drivers that may be used to influence a substance in a specular holographic display via resonant audio for 3D holographic image rendering.

Describing the exploded side view of FIG. 6 in detail, this figure shows a non-limiting example of how resonant audio components of a specular holographic display may be used to manipulate the substance in the display to establish ridges in the display's reflective surface, thus rendering 3D holographic images consistent with present principles. In this particular embodiment, the display may use an array 600 of individually-activable speaker drivers 610 mounted underneath the display surface 620. The production of resonant audio through one or more of the drivers 610 may therefore cause the aforementioned substance (as encased within the surface 620) to take on desired shape(s) above the activated drivers 610 to create the desired holographic effect.

Note that the drivers 610 may be arranged in the array 600 in M-by-N grid format, though other speaker driver arrangements may also be used. Also note that in one particular example, the array 600 may establish an X-Y plane that is parallel to another X-Y plane established by the display surface 620 when the components are assembled together on the specular holographic display itself.

Describing the (front) surface 620 in more detail, it may be flexible with its outer side being reflective, similar to the surface 210 described above. Additionally, the surface 620 may be generally shaped as a rectangular prism in non-limiting embodiments, with the substance (e.g., liquid or solid) being encased within. However, other shapes may also be used for the surface 620. Also note that in certain examples, the substance inside the surface 620 may be reflective (e.g., where the surface's outer side itself is transparent).

In any case, the substance encased within the surface 620 may be controlled by the array 600 of speaker drivers 610 to move the substance within the surface 620, forming desired ridges on the outer side of the surface 620 that extend distally away from the display itself to create a 3D effect via virtual points created by the surface 620 as discussed above. Accordingly, with the reflective surface 620 placed on top of the array 600 in an assembled specular holographic display, the display may selectively, individually, and dynamically actuate one or more of the speaker drivers 610 (e.g., but not all of them concurrently), which in turn may cause the substance in the surface 620 to form raised ridges 630 above the activated speaker drivers 610 according to the Z dimension as long as the relevant drivers 610 continue to produce resonant audio waves over time to maintain the desired 3D image (e.g., until another 3D image is to be rendered, in which case the selected drivers 610 may change to then render the next 3D image).

It may be appreciated that in the example of FIG. 6, the ridges 630 establish circular 3D patterns, with currently-actuated drivers 610 being shown with darker shading to demonstrate selective (current) activation of those drivers 610 at a given point in time to produce the resonant audio. Corresponding regions of the surface 620 above the activated drivers 610 (according to the Z dimension) may thus exhibit the circular ridges 630 due to at least some of the substance in the surface 620 being acoustically influenced by the sound from the activated drivers 610 to form the ridges themselves. The activated drivers 610 may therefore direct at least some of the substance to accumulate at the desired locations of the surface 620, arranging at least some of the substance in the display to establish contours to render the desired 3D image. It may thus be appreciated that the raised ridges 630 formed by the higher concentration of the substance at the relevant surface regions may create a specular holographic effect when a user views the outer side of the surface 620 as described herein.

Then when the activated speaker drivers are turned off or otherwise no longer actuated to produce resonant audio (e.g., they stop emitting acoustic waves), the substance that has concentrated at the desired surface areas to create the desired ridges 630 may disperse within the surface 620, making the outer surface flat again. Also note that the surface 620 may additionally or alternatively be flattened (and substance therefore dispersed) as described in reference to block 580 above.

With the foregoing in mind, according to one specific example implementation, a processor system within (or in communication with) a specular holographic display that includes resonant audio components described above may selectively actuate, to render a first 3D image on the specular holographic display, one or more first speaker drivers in the array 600 but not one or more second speaker drivers in the array 600. The processor system may then identify a trigger to present a second 3D image on the specular holographic display that is different from the first 3D image. In response to the trigger, the processor system may then selectively actuate, to render the second 3D image on the specular holographic display, one or more third speaker drivers in the array 600 but not the first speaker drivers. Thus, in some specific non-limiting instances, the processor system may deactivate the first drivers responsive to the trigger so that they stop producing acoustic waves before or concurrent with actuating the third drivers to produce different resonant acoustic waves for the second 3D image. The third speaker drivers may be the same as, or different from, the second speaker drivers.

Also note consistent with present principles that the Z dimension height of the ridges that are formed for the first and second 3D images may vary according to the amplitude of the resonant acoustic waves that are produced by the relevant speaker driver(s) 610 beneath the surface 620. Accordingly, each driver 610 may be selectively and independently controlled (e.g., volume control) such that progressively (e.g., incrementally) greater acoustic wave amplitudes for acoustic waves from that driver are used to create progressively (e.g., incrementally) higher ridges, and progressively smaller acoustic wave amplitudes for the waves from that driver are used to create progressively lower ridges. In this way, the display may create an intended specular holographic effect with different virtual points appearing at different depths in real space from the perspective of the viewer according to the amplitudes of resonant audio produced by each respective driver 610 beneath the relevant point on the surface 610.

Also note that each driver may emit, at a given time, resonant audio waves not just of a different amplitude but also of a different frequency than other drivers to produce a desired overall 3D image, with present principles recognizing that different frequencies of acoustic waves may be used to create different shapes in the substance inside the surface 620. Thus, by dynamically and individually varying the frequency and/or amplitude of the resonant acoustic waves that are concurrently emitted by each active driver 610, different shapes having different heights may be concurrently created at different locations on the surface 620 to produce a composite 3D image. Resonant acoustic waves from each speaker driver may also be modulated together (e.g., harmonically) to create a combined wave to produce a desired 3D effect.

What's more, it is to be further understood consistent with present principles that the resonant acoustic waves that are emitted by each speaker driver are not necessarily limited to frequencies in the range of human hearing (e.g., 20 Hz to 20,000 Hz), and may include resonant audio in other frequencies above and below that range to nonetheless influence and direct the substance within the surface 620 to desired locations to render a 3D hologram.

Also note that FIG. 6 shows but one example embodiment, and that other resonant audio embodiments are also encompassed by present principles. For example, in some instances, two (or more) surfaces like the surface 620 may be used together, where each surface may be slid left and right as well forward and backward in the X-Y dimension to create an enhanced asymmetrical 3D effect. Each surface may also be moved apart from the other one(s) in the Z dimension as appropriate for a desired 3D effect. But note that each of those surfaces may still be above the array 600 in parallel X-Y planes, if desired. Further note that in one example instance, movement of those surfaces may be performed using microelectromechanical systems (MEMS) linkage and other MEMS components (e.g., motors) controllable by the display's processor system. Accordingly, in implementing one of these example embodiments, the display may provide even more variations and complexity in terms of the types of contours and hence 3D images that can be presented. Additionally, in some non-limiting examples an artificial intelligence (AI) model such as one of the machine learning models described above may be used to infer different driver and surface combination actuations to implement to create a desired 3D image using the two (or more) surfaces 620 operating together. One or more of the surfaces may even have a shorter height in the Z dimension than other surfaces, if desired, to further assist in implementing present principles.

It may now be appreciated that present principles provide for an improved computer-based user interface. The disclosed concepts are rooted in computer technology for computers to carry out their functions.

Components included in one embodiment can be used in other embodiments in any appropriate combination. For example, any of the various components described herein and/or depicted in the Figures may be combined, interchanged or excluded from other embodiments.

It is to be understood that whilst present principles have been described with reference to some example embodiments, these are not intended to be limiting, and that various alternative arrangements may be used to implement the subject matter claimed herein. Accordingly, while particular techniques and devices are herein shown and described in detail, it is to be understood that the subject matter which is encompassed by the present application is limited only by the claims.

What is claimed is:

1. A device, comprising:
a processor system; and
storage accessible to the processor system and comprising instructions executable by the processor system to:
actuate one or more first speaker drivers in a specular holographic display to render a first three dimensional (3D) image on the specular holographic display;

receive a command to present, on the specular holographic display, a second 3D image that is different from the first 3D image; and responsive to the command, actuate one or more second speaker drivers in the specular holographic display to render the second 3D image on the specular holographic display.

2. The device of claim 1, wherein the one or more second speaker drivers are different from the one or more first speaker drivers.

3. The device of claim 1, wherein the one or more first speaker drivers and the one or more second speaker drivers are actuated to establish one or more contours in a substance in a display surface of the specular holographic display.

4. The device of claim 3, wherein the substance is established by one or more of: a liquid, a solid.

5. The device of claim 4, wherein the substance is established by one or more of: an oil, a powder.

6. The device of claim 4, wherein the substance is reflective.

7. The device of claim 1, wherein the one or more first speaker drivers and the one or more second speaker drivers are arranged in a grid array within the specular holographic display.

8. The device of claim 7, wherein the instructions are executable to:

selectively actuate the one or more first speaker drivers in the grid array to direct a substance within the specular holographic display to desired locations on a display surface of the specular holographic display to render the first 3D image; and selectively actuate the one or more second speaker drivers in the grid array to direct the substance to desired locations on the display surface to render the second 3D image.

9. The device of claim 1, wherein the command is a command to rotate an object represented by the first 3D image, and wherein the second 3D image is a rotated version of the first 3D image.

10. The device of claim 1, wherein the command is generated based on detecting head movement of a viewer.

11. The device of claim 1, comprising the specular holographic display.

12. A method, comprising:

actuating one or more first speaker drivers in a display to establish first contours on the display to render a first three dimensional (3D) image;

identifying a trigger to present, on the display, a second 3D image that is different from the first 3D image; and responsive to identifying the trigger, actuating one or more second speaker drivers in the display to establish second contours on the display to render the second 3D image.

13. The method of claim 12, wherein the display is a specular holographic display.

14. The method of claim 12, wherein the one or more first speaker drivers comprise plural first speaker drivers, wherein the one or more second speaker drivers comprise plural second speaker drivers, and wherein the method comprises:

individually actuating each of the plural first speaker drivers to arrange at least some of a substance in the display to establish the first contours; and individually actuating each of the plural second speaker drivers to arrange at least some of the substance to establish the second contours.

15. The method 12, wherein the one or more first speaker drivers and the one or more second speaker drivers are arranged in a speaker array within the display.

16. A device, comprising:

at least one computer readable storage medium (CRSM) that is not a transitory signal, the at least one CRSM comprising instructions executable by a processor system to:

control one or more speaker drivers in a speaker array to produce acoustic waves that render, on a specular holographic display, a three dimensional (3D) image.

17. The device of claim 16, wherein the instructions are executable to:

control the one or more speaker drivers to produce resonant acoustic waves that render, on the specular holographic display, the 3D image.

18. The device of 16, comprising the speaker array.

19. The device of claim 18, wherein the speaker array comprises plural speaker drivers arranged in M-by-N grid format.

20. The device of claim 16, comprising the processor system.

* * * * *